United States Patent
Shmiel et al.

(10) Patent No.: US 10,467,256 B2
(45) Date of Patent: Nov. 5, 2019

(54) AUTOMATIC QUERY PATTERN GENERATION

(71) Applicant: Google Inc., Mountain View, CA (US)

(72) Inventors: Tomer Shmiel, Ramat Gan (IL); Dvir Keysar, Herzliya (IL); Vered Cohen, Herzliya (IL)

(73) Assignee: GOOGLE LLC, Mountain View, CA (US)

( * ) Notice: Subject to any disclaimer, the term of this patent is extended or adjusted under 35 U.S.C. 154(b) by 503 days.

(21) Appl. No.: 15/227,456

(22) Filed: Aug. 3, 2016

(65) Prior Publication Data

US 2017/0039267 A1    Feb. 9, 2017

Related U.S. Application Data

(60) Provisional application No. 62/200,819, filed on Aug. 4, 2015.

(51) Int. Cl.
| | |
|---|---|
| *G06F 16/2455* | (2019.01) |
| *G06F 16/2457* | (2019.01) |
| *G06F 16/9032* | (2019.01) |
| *G06F 16/28* | (2019.01) |
| *G06F 16/901* | (2019.01) |

(52) U.S. Cl.
CPC ........ *G06F 16/285* (2019.01); *G06F 16/2455* (2019.01); *G06F 16/24573* (2019.01); *G06F 16/9024* (2019.01); *G06F 16/90324* (2019.01)

(58) Field of Classification Search
USPC ......................................................... 707/740
See application file for complete search history.

(56) References Cited

U.S. PATENT DOCUMENTS

| | | | |
|---|---|---|---|
| 2003/0120647 A1* | 6/2003 | Aiken | G06F 17/30628 |
| 2010/0161642 A1 | 6/2010 | Chen et al. | |
| 2012/0084282 A1* | 4/2012 | Chiang | G06F 17/30864 |
| | | | 707/725 |
| 2012/0259801 A1 | 10/2012 | Ji et al. | |
| 2014/0358889 A1 | 12/2014 | Shmiel et al. | |
| 2015/0081656 A1 | 3/2015 | Wang et al. | |
| 2015/0310058 A1* | 10/2015 | Kraft | G06F 17/30386 |
| | | | 707/758 |

OTHER PUBLICATIONS

International Search Report and Written Opinion for PCT Patent Application No. PCT/US2016/045484, dated Oct. 21, 2016, 13 pages.

* cited by examiner

*Primary Examiner* — Muluemebet Gurmu
(74) *Attorney, Agent, or Firm* — Brake Hughes Bellermann LLP

(57) ABSTRACT

One general aspect is described that includes a computer implemented method for generating a pattern graph. The method may include accessing data pertaining to a corpus of web documents. The data may include a plurality of query-document pairs. The method may also include identifying at least one query pattern in the plurality of query-document pairs and the query pattern may be associated with a portion of web documents in the corpus. The method may also include identifying a plurality of sub-phrases in the at least one query pattern, determining, in the corpus of web documents, a plurality of other query patterns that include at least one of the plurality of sub-phrases, and assigning an classifier to the at least one query pattern and each of the plurality of other query patterns that include at least one of the sub-phrases.

20 Claims, 8 Drawing Sheets

AUTOMATIC QUERY PATTERN GENERATION

CROSS-REFERENCE TO RELATED APPLICATIONS

This application claims priority to and the benefit of U.S. Patent Application Ser. No. 62/200,819, entitled "Automatic Query Pattern Generation," filed on Aug. 4, 2015, the disclosure of which is incorporated herein by reference.

TECHNICAL FIELD

This description generally relates to the use of search systems. In particular, this description relates to generating and using query pattern graphs.

BACKGROUND

Internet search engines can return search results in response to a user-submitted search query. Some search results may be deemed responsive to the user's search query and other search results may be deemed tangential, or marginally relevant. Since users generally are searching for helpful information, providing the most responsive search results according to the user's needs can save the user time and can remove the burden of having to perform multiple search queries to find the desired information.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer implemented method for generating a pattern graph. The method may include accessing data pertaining to a corpus of web documents. The data may include a plurality of query-document pairs. The method may also include identifying at least one query pattern in the plurality of query-document pairs and the query pattern may be associated with a portion of web documents in the corpus. The method may also include identifying a plurality of sub-phrases in the at least one query pattern, determining, in the corpus of web documents, a plurality of other query patterns that include at least one of the plurality of sub-phrases, and assigning an classifier to the at least one query pattern and each of the plurality of other query patterns that include at least one of the sub-phrases. The method may further include associating the classifier with the portion of web documents in the corpus and aggregating the query pattern and the other query patterns into a pattern graph. Other embodiments of this aspect include corresponding computer systems, apparatus, and computer programs recorded on one or more computer storage devices, each configured to perform the actions of the methods.

Implementations may include one or more of the following features. The method as described above and additionally including the pattern graph being configured to represent similarities between at least two of the portions of web documents. The method as described above in which the classifier is associated with user input and includes one or more determined topic categories and a level of specificity within the one or more topic categories. The method may further include assigning the classifier to the at least one query pattern based on matching at least one of the sub-phrases to at least one web document in the corpus. The method may further include identifying a plurality of additional query patterns in the plurality of query-document pairs. In some implementations, the method may include, for each of the additional query patterns, identifying a plurality of sub-phrases in the additional query patterns and determining, in the corpus of web documents, a plurality of other query patterns that include at least one of the plurality of sub-phrases in the additional query patterns, assigning the classifier to the additional query pattern and each of the other query patterns, associating the classifier with a portion of web documents in the corpus, and aggregating the additional query patterns into the pattern graph according to the classifier.

In some implementations, aggregating the query pattern and the other query patterns into a pattern graph includes assembling a graph that includes a plurality of nodes and edges in which each node represents a query pattern and each edge representing a score of similarity between two or more query patterns in the graph. In some implementations, the method may include using a neighbor node to filter out one or more query patterns that correspond to classifiers other than the associated classifier. In some implementations, the pattern graph includes at least one of a histogram, a matrix, a plot, and a scatter plot matrix. Implementations of the described techniques may include hardware, a method or process, or computer software on a computer-accessible medium.

In another general aspect, a computer implemented method is described that includes obtaining a plurality of search queries, generating a plurality of translated search queries based on the plurality of search queries, generating a translation pair for each search query and translated search query. For each generated translation pair, the method can include applying a query annotator to determine a matching identifier between phrases in the translation pair, replacing the at least one matching identifier with a placeholder in response to determining at least one matching identifier. The placeholder may indicate a pattern relationship between the search query and the translated search query corresponding to the translation pair. The method may include generating at least one query pattern to represent the translation pair, the query pattern based at least in part on the matching identifier and expanding the at least one query pattern for the translation pair by swapping sub-phrases in the search queries that surround the matching identifier with sub-phrases in the translated search queries that surround the matching identifier.

Implementations may include one or more of the following features. The method may include aggregating, for each translation pair, the at least one query pattern into a histogram of query patterns. In some implementations, the method may include assigning a classifier to the at least one query pattern, the classifier indicating a desire of a user to access information stored in web documents in a corpus, and associating the classifier with the translation pair, the associating including mapping the at least one query pattern to one or more translated search query pattern. In some implementations, each translation pair includes a query pattern and a translated query pattern.

In another general aspect, a system is described that includes one or more computers configured to perform particular operations or actions by virtue of having software, firmware, hardware, or a combination of them installed on the system that in operation causes or cause the system to perform operations. The system may include at least one processor and memory storing instructions that, when executed by the at least one processor, cause the system to perform operations including, accessing data pertaining to a corpus of web documents, the data including a plurality of query-document pairs, identifying at least one query pattern in the plurality of query-document pairs, the query pattern being associated with a portion of web documents in the corpus, identifying a plurality of sub-phrases in the at least one query pattern, determining, in the corpus of web documents, a plurality of other query patterns that include at least one of the plurality of sub-phrases, assigning an classifier to the at least one query pattern and each of the plurality of other query patterns that include at least one of the sub-phrases, the classifier indicating a desire of a user to access information stored in the portion of web documents in the corpus, associating the classifier with the portion of web documents in the corpus, and aggregating the query pattern and the other query patterns into a pattern graph. In some implementations, the classifier is associated with user input and includes one or more determined topic categories and a level of specificity within the one or more topic categories.

Implementations of the system may also include operations in which the pattern graph is configured to represent similarities between at least two of the portions of web documents. The operations may also include assigning the classifier to the at least one query pattern based on matching at least one of the sub-phrases to at least one web document in the corpus. The operations may also include identifying a plurality of additional query patterns in the plurality of query-document pairs, and for each of the additional query patterns, the operations can include identifying a plurality of sub-phrases in the additional query patterns and determining, in the corpus of web documents, a plurality of other query patterns that include at least one of the plurality of sub-phrases in the additional query patterns, assigning the classifier to the additional query pattern and each of the other query patterns, associating the classifier with a portion of web documents in the corpus, and aggregating the additional query patterns into the pattern graph according to the classifier.

In some implementations, aggregating the query pattern and the other query patterns into a pattern graph includes assembling a graph that includes a plurality of nodes and edges, each node representing a query pattern and each edge representing a score of similarity between two or more query patterns in the graph. Implementations of the system can use a neighbor node to filter out one or more query patterns that correspond to classifiers other than the associated classifier. In some implementations, the pattern graph includes at least one of a histogram, a matrix, a plot, and a scatter plot matrix. Implementations of the described techniques may include hardware, a method or process, or computer software on a computer-accessible medium.

Other embodiments of this aspect include corresponding computer systems, apparatus, and computer programs recorded on one or more computer storage devices, each configured to perform the actions of the methods.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
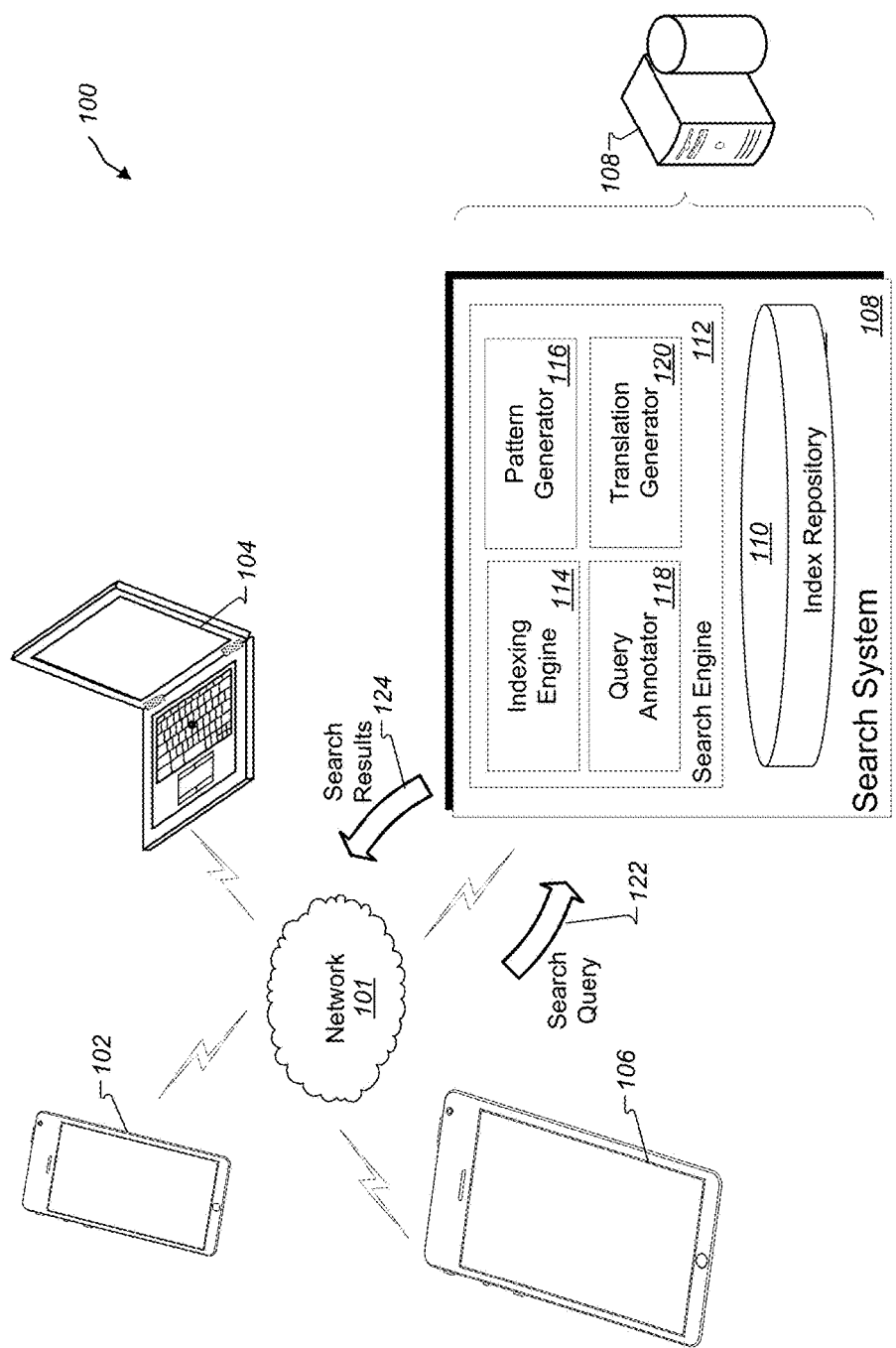
FIG. 1 is a block diagram of an example search system.

Users of a search system generally wish to access online information to become educated on a particular topic or interest area. Many users have a few keywords in mind when searching for information on the Internet. The keywords (e.g., forming a search query) can be used to determine an intent, belonging to the user. The intent may indicate the extent of the information desired by the user and can be captured using a classifier to capture a context for one or more actions performed by the user. Such a classifier can be inferred by a search system, using the actions performed, to determine a purpose for searching for information and to assign a context to the search using the classifier. For example, the intent (e.g., classifier) can indicate one or more topics in which the user wishes to view in her search results and with what level of specificity the user desires within these topics. In some implementations, the intent/classifier is associated with and/or determined from user input and may include one or more determined topic categories. For example, entered symbols, letters, numbers or entire search queries can constitute user input. In some implementations, the classifier may include a level of specificity within the one or more topic categories.

In one non-limiting example, the two queries [Barack Obama] and [Obama 2004 convention speech] indicate a desire for information about different topics and different levels of specificity. The search system is typically charged with using the search query to determine user intent, assigning a classifier based on the intent, translating the intent/classifier into machine language, and executing one or more searches to find appropriate information for display to the user. The systems and methods described in this disclosure are configured to analyze search queries, query patterns, and query documents to generate additional queries, query patterns, and query graphs that can be used to provide search content that matches one or more intents indicated by users entering search queries into search engines.

In general, search queries and search documents can have different resolution of user intent. Rather than going from search queries to documents (and risk losing sub-intents of the search queries), the systems and methods described in this disclosure can use search documents to map user intent back to search queries. In this way, the algorithms can be used that leverage exactly the intent separation implied by the documents, and the intent can be projected onto the queries using the classifier. This mapping can be used to generate and match query patterns, which can be used to match search results to user-entered search queries.

In addition, the systems and methods described herein can detect a query pattern associated with a user-entered search query and automatically generate similar query patterns based on the detected query pattern. In particular, the systems and methods described herein can access search documents that match a detected query pattern to generate one or more query patterns that can be used to find documents similar to the accessed search documents. Using search documents to determine an intent in a query can provide the advantage of leveraging the intents and/or sub-intents implied by the documents and projecting those intents and/or sub-intents onto the received search queries.

As used herein, a query template represents a query phrase that includes query portions (e.g., sub-phrases) and support to specify substitution portions. For example, the query template [weather in X] can be used to represent queries such as [weather in Paris], [weather in NYC], and [NYC weather]. The "X" represents substitution portions, while the terms "weather", "NYC", and "Paris" represent query portions.

As used herein, a query pattern represents a query template that repeats in search logs in a search system. For example, a query pattern may be a generalized representation of queries that match a given query template. For example, the query pattern [weather in X] may represent all queries that include the term "weather" and a term that identifies a geographic location, such as [weather in Paris], [weather in NYC], [weather in the east coast], and [weather near me]. A query pattern can provide one or more predefined rules for matching a received query and interpreting the matched query. A query pattern can include, for example, a language identifier (e.g., French), a country or domain (e.g., France), stopwords, a connector, a confidence value, and a query splits filter strategy. Stopwords, e.g., "a" and "the" are words that do not provide information that assists in identifying search results (e.g., does not influence the results). The stopwords can be removed according to the pattern so that the stopwords are ignored in the input query when matching the query to a query pattern.

As used herein, a query annotator represents a module that determines which entities appear in a given query, where each such entity has a canonical representation that is independent of the language. For example, applying a query annotator on the query "weather in Paris" may annotate the string "Paris" with a unique identifier (e.g., "/m/05qtj") that represents the canonical representation of "Paris," the capital city of France.

Given such query templates, query patterns, and query annotators, the systems and methods described herein can find or generate other query patterns that likely express the same user intent. As an example, desired query patterns for [weather in X] can include [X weather], [what is the weather in X], [what's the weather like in X], [what's the temperature in X], [is it raining in X], etc. This is because a user who searches for [weather in Paris] and a user who searches for [Paris weather] likely have a similar intent for accessing the same type of information.

FIG. 1 is a block diagram of an example search system 100. The system 100 can provide users with search results that are relevant to user-submitted queries. In general, the search system 100 may represent an information retrieval system in which the systems, components, and techniques described herein can be implemented.

The example system 100 includes a plurality of computing devices that can exchange data over a network 101. The devices may represent clients or servers and can communicate via network 101 or other network. The client devices may include a mobile device 102, a laptop computing device 104, and a tablet computing device 106. The server device shown here is a server computing device, represented as a search system 108. Additional devices are possible and such devices may be configured to be substituted for one another, as described below. In some implementations, the devices 102, 104, 106, and 108 can be laptop or desktop computers, smartphones, personal digital assistants, portable media players, tablet computers, or other appropriate computing devices that can communicate, using the network 101, with other computing devices or computer systems.

Mobile device 102 is represented here as a smart phone. The example mobile device 102 can include one or more processors (e.g., client central processing unit (CPU)) and one or more memory devices (e.g., client memory)). The mobile device 102 can execute a client operating system (O/S) and one or more client applications that can display a user interface (UI) on a display device included in the mobile device 102.

As shown in FIG. 1, the system 100 includes the server search system 108, which can include one or more computing devices and one or more computer-readable storage devices (e.g., index repository 110). The search system 108 can include one or more processors and one or more memory devices and can function as a search system including web browser implementations and connections to other servers that can provide users with information. The computing devices 102, 104, and 106 can communicate with the search system 108 (and the server computing device 108 can communicate with the computing devices 102, 104, and 106) using the network 101. The search system 108 can execute a server O/S.

As shown, the search system 108 includes a search engine 112. Search engine 112 can include, or have access to, an indexing engine 114, a pattern generator 116, a query annotator 118, and a translation generator 120. The search engine 112 can be implemented as, for example, computer programs running on one or more computers in one or more locations that are coupled to each other through a network.

The indexing engine 114 can generate, maintain, and update one or more index repositories 110. The index repositories 110 can include indexed resources (e.g., query templates, query annotators, query patterns, web pages, images, or news articles on the Internet) found in one or more corpuses or repositories of content around the Internet and on search servers and systems throughout the world.

The pattern generator 116 can be configured to convert a set of similar search queries to a set of patterns, using repeating sub-phrases from the search queries. The set of patterns can be aggregated into a pattern graph based on billions of web documents available on the Intranet. In general, every document on the Internet may contribute several pairs of query patterns that may be similar. These pairs are the basis of the aggregated pattern graph. In the aggregated pattern graph, each query pattern represents a node and every two similar nodes are connected on an edge of the graph. The similarity between two connected nodes can be quantified by a similarity score for the edge that connects the two nodes. A pair of similar nodes can be known as similar neighbors. The use of similar neighbors to filter off-topic candidate patterns can provide the advantage of lessening the occurrence of a user receiving inaccurate search results in examples in which two patterns are considered similar based on the two patterns returning similar search results, even though the user intent of the two patterns actually is not similar (e.g., for the query patterns [X treatment] and [X symptoms]). This is because many documents get traffic from both patterns. Using similar neighbors criteria, the algorithms used in system 100 can determine that particular patterns are not actually similar even if related documents show up in the same search results.

In a non-limiting example, a document that is associated with a topic of "things to do in California" may be provided and selected by users, in response to the users entering queries such as (a) "things to do in california", (b) "what to do in california", (c) "california attractions", (d) "best things to do california," etc. The system 100 can search for sub-phrases that are common to many of the queries (a)-(d) and other similar queries (e.g., "california" would be one of them) and can replace "california" with an "X." Thus, the system 100 can generate the following query patterns [things to do in X], [what to do in X], [X attractions], [best things to do X], etc. The system 100 can then add a connection between every possible pair of these query patterns with an associated score, based on the fraction of clicks that the two queries brought to the page, for example. In the event that these pairs of patterns have been previously seen by system 100 before, a previous score and a current score can be summed together to generate an updated score. For example, a document having a topic of "things to do in paris" may also contribute to a pair such as "things to do in X" and "what to do in X," which can be implied by X="paris" for this page.

In the above example, the pattern generator 116 can convert the similar queries to query patterns without using the query annotator 118 because the pattern generator 116 can interpret an entity from a given set of similar queries and has no need to access the annotated information. In general, the system 100 can employ algorithms based on going from search documents to search queries and not vice versa, as done in traditional search techniques. This can allow the system 100 to leverage existing clustering structure in which each document is a pivot as well as to leverage global clustering over all queries.

In some implementations, the pattern generator 116 can perform query clustering. For example, traditional clustering can include clustering by similar search results. One advantage of this can include leveraging the power of previously performed searches and their successes (by click, access, etc.). Such successes can be repeated by providing the same search results in response to another user entering the same search query. One disadvantage of traditional clustering may be losing other search results in a list provided to the user because the list is not regenerated using the query terms. The list may simply be re-retrieved in the same form, thus losing potential new content. For example, a search query of "how to tie a tie in 15 seconds" may not provide any search results that include the "15 seconds," as the system may focus on the instructions to tie the tie, rather than the time portion of the search query. System 100 can be configured to include the time portion into the query and subsequent search results, to preserve all sub-intents in the query.

The query annotator 118 can annotate each query in the collection of queries. Each search query is typically annotated with particular labels that identify parts of the query. The labels are specified in accordance with one or more query pattern components, e.g., {prefix} {suffix} {query} and {connector}. Thus, the annotations may be taken from the query pattern and matched to corresponding query terms. For example, the query "ice cream near St. Louis" can be annotated with the labels {what} {connector} {where} from a matching query pattern.

The translation generator 120 can be configured to learn translations for particular query patterns. The translation generator 120 can also be configured to translate particular query patterns based on entity annotation or other metrics associated with query patterns. In some implementations, the translation generator 120 can translate a set of query patterns from one language to another. This allows, for example, generator 120 to convert an existing set of English patterns to other languages.

In general, users (not shown) can interact with the search system 108 through a client device (e.g., mobile device 102, laptop computing device 104, or tablet computing device 106). For example, the mobile device 102 can be a computer device coupled to the search system 108 through the Internet (e.g., network 101) and can access data on search system 108 through a web browser connected to the Internet.

In a non-limiting example, a user (not shown) can submit a search query (e.g., represented by arrow 122) to a search engine 112 within search system 108. When the user submits the search query 122, the search query 122 may be transmitted through network 101 to the search system 108. The search system 108 can respond to the search query 122 by generating search results (represented by arrow 124), which can be transmitted through the network 101 to the mobile device 102, for example, in a form that can be presented to the user. For example, the search results 124 can be presented as a links to web pages that may be rendered by a web browser running on the mobile device 102).

When the search query 122 is received by the search engine 112, the search engine 112 can identify resources that match the search query 122. The search engine 112 can use the index repository 110 to access and provide users with search results 124 that are relevant to the received search query 122. Providing users with search results can include assessing what the user is attempting to find and narrowing the assessment to determine the intent that the user had in mind when performing the search.

In general, there can be many more user intents than actual available web pages on the Internet. In addition, since search engines generally return at least some set of search results in response to user-entered search queries, it is possible that some of the search results may be provided based on a misinterpreted intent or sub-intent associated with the entered search query.

The system 100 can provide an advantage of clarifying search query intent. For example, if two search queries such as "diabetes symptoms in children" and "diabetes symptoms in children in age 7 to 9" were entered into a search engine, the two queries may have similar results. However, the narrow query of "diabetes symptoms in children ages 7 to 9" may have a narrower set of search results than the broader query of "diabetes symptoms in children." As such, the system 100 can take a typically overly broad set of search results and narrow the results accordingly, for example, when a narrow intent is determined. In particular, if the queries are entered in an uncommon (or even a relatively common) foreign language, fewer statistical information may be available for the foreign language query interpretation than an English query interpretation. The systems 100 can determine that fewer statistics are available for the foreign language and can analyze the search query to determine possible additional intent.

The index repository 110 can include indexed resources (e.g., query templates, query annotators, query patterns, web pages, images, or other content) found in one or more corpuses or repositories of content. In some implementations, the index repository 110 store may be several repositories and each repository can include different types of resources that can be searched separately using part, or all, of the search query 122. For example, the index repository 110 can store index information associated with geographic resources, local resources, or other types of specifically indexed resources. The search engine 112 can submit the search query 122 or a query component to particular indices depending on the interpretation of the query, e.g., using a query pattern, as described herein. The search engine 112 can transmit the search results 124 through the network 101 to the mobile device 102, for example, for presentation to the user.

Referring again to FIG. 1, the network 101 can be a public communications network (e.g., the Internet, cellular data network, dialup modems over a telephone network) or a private communications network (e.g., private LAN, leased lines). In some implementations, the computing devices 102, 104, 106, and 108 can communicate with the network 101 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

In some implementations, the search system 108 can represent more than one computing device working together to perform server-side operations. For example, though not shown in FIG. 1, the search system 108 can include a computer system that includes multiple servers (computing devices) working together to perform server-side operations. In this example, a single proprietor can provide the multiple servers. In some cases, the one or more of the multiple servers can provide other functionalities for the proprietor. In a non-limiting example, the computer system can also include a search server and a web crawler server.

Figure 2A:
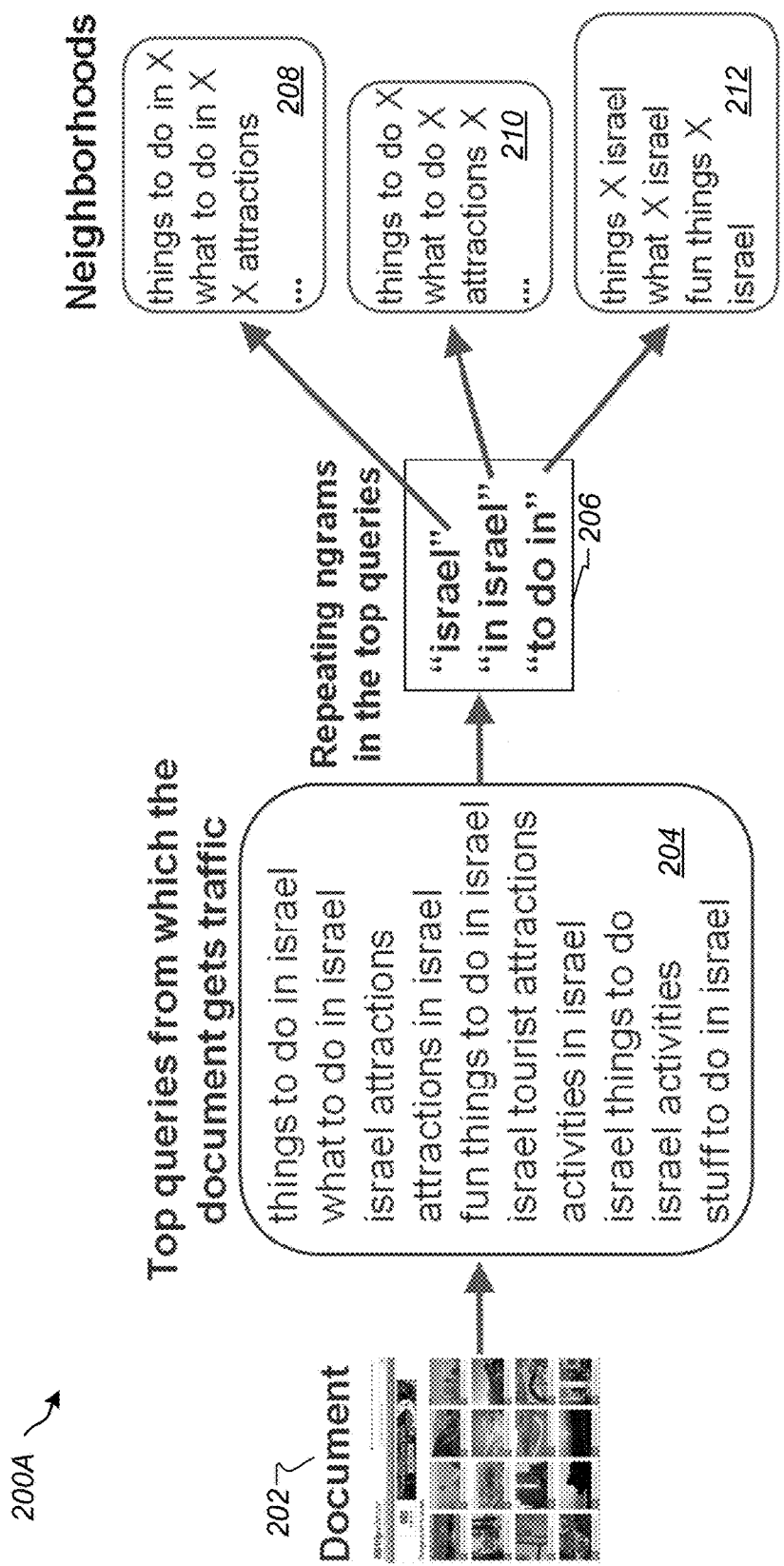
FIGS. 2A and 2B depict an example diagram of generating a query pattern.
Figure 2B:
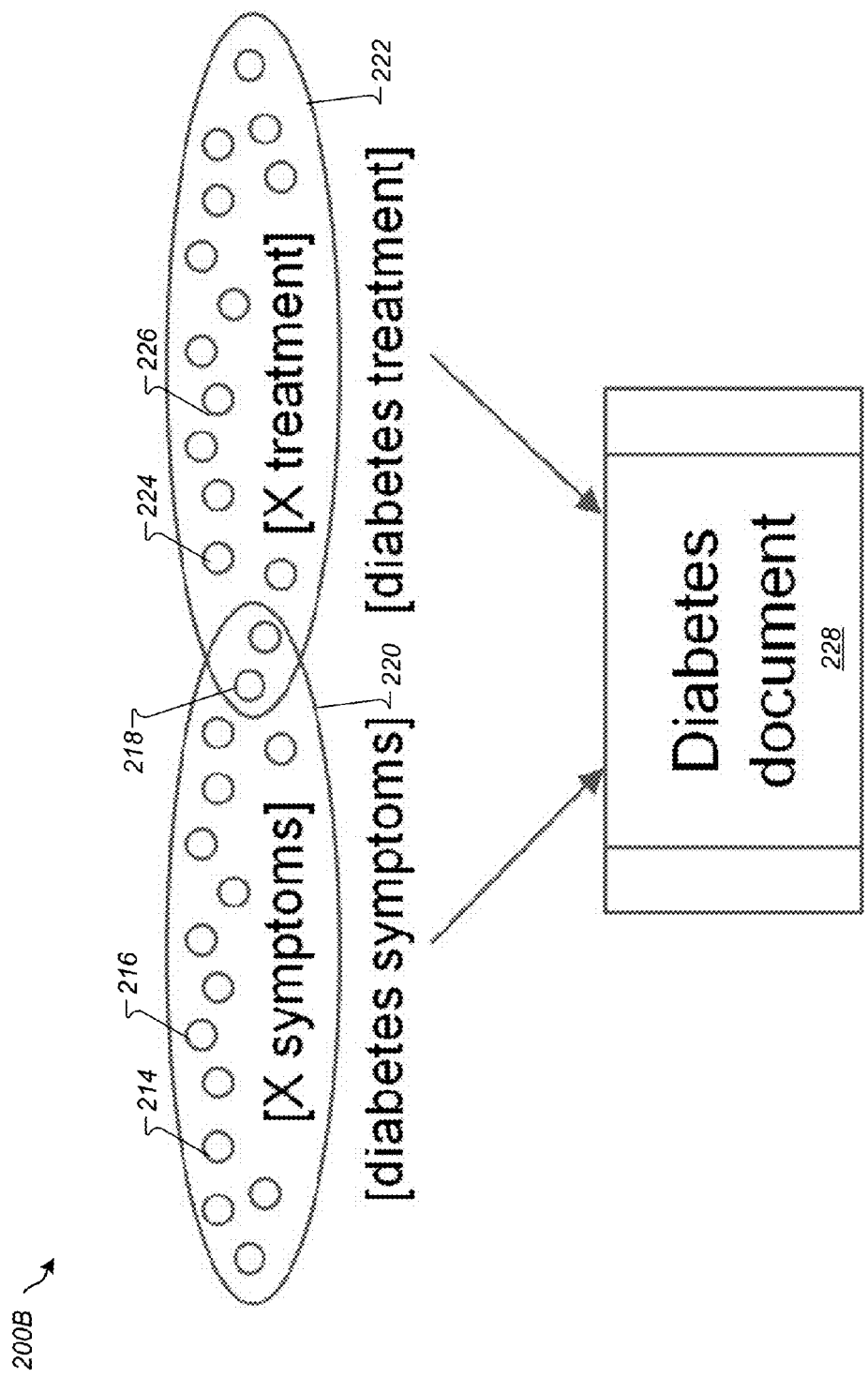

FIGS. 2A and 2B depict an example diagram 200A of generating a query pattern. As shown in FIG. 2A, a query pattern can be generated by analyzing documents 202. For example, the pattern generator 116 can begin analyzing a set of documents 202. The documents 202 correspond to pictures and search results in Israel. The analysis can include accessing indexed information from index repository 110, or other repositories. The pattern generator 116 can determine that the top queries from which particular documents 202 receive traffic from (e.g., as determined by a user clicking on links to the documents 202, where the links are provided in response to queries) are "things to do in Israel", "what to do in Israel", "Israel attractions", "attractions in israel", etc., as shown at box 204. Next, the pattern generator 116 can determine if any repeating ngrams (e.g., sub-phrases) exist in the top queries 204, as shown at box 206 as "Israel", "in Israel," and "to do in." Upon determining the repeating ngrams, the pattern generator 116 can generate neighborhoods 208, 210, and 212 corresponding to possible query patterns that relate to the documents. In particular, neighborhood 208 includes [things to do in X], [what to do in X], and [X attractions]. In operation, the pattern generator 116 uses the repeating ngrams common to the queries 204 and generates query patterns 208, 210, 212 that may be connected in a pattern graph, based on a similarity amongst the query patterns 208-212.

FIG. 2B depicts an example diagram 200B for computing a common neighbor ratio for two search queries (a) diabetes symptoms and (b) diabetes treatment. When representing the search queries as a set of search results result in an overly broad set of search results, such as the union of documents matching the two search queries (a) diabetes symptoms and (b) diabetes treatment, the system 100 can ensure that such overly broad set of search results may be avoided as follows: In this example, the pattern generator 116 can take documents 214, 216, and 218 that match the query pattern [X symptoms] 220 and attempt to connect the query pattern 220 to another similar query pattern, such as [X treatment] 222. Documents 218, 224, and 226 correspond to query pattern 222. In this example, the pattern generator 116 can determine that document 218 is present in both query patterns 220 and 222. Hence matching a query pattern and connecting to similar query patterns has the effect that an overly broad set of search results such as the union of documents matching the two search queries (a) diabetes symptoms and (b) diabetes treatment is avoided. Accordingly, the two query patterns may be common neighbors and have some ratio of commonality that can be represented in a pattern graph. Furthermore, both query patterns 220 and 222 can point to diabetes document 228 based at least in part on the overlapping document 218.

Figure 3:
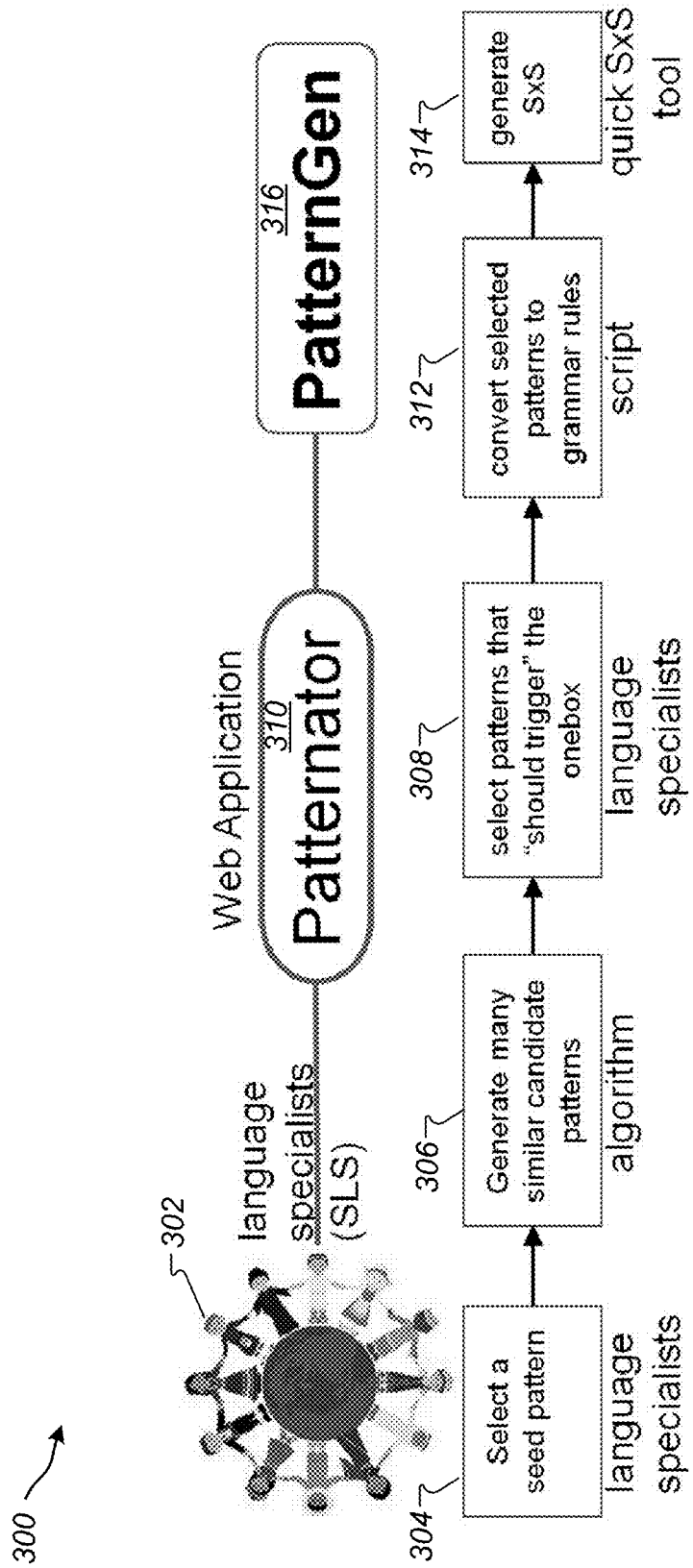
FIG. 3 depicts an example diagram of generating a grammar.

FIG. 3 depicts an example process 300 for generating a grammar. Here, the pattern generator 116 can generate the grammar. For example, the pattern generator 116 can begin with information from one or more language specialists 302 by selecting a seed pattern, as shown at box 304. At box 306, the pattern generator 116 can generate many similar candidate patterns using one or more of the algorithms described herein. At box 308, the pattern generator 116 can select patterns (from a web application 310) that are likely to trigger a search onebox. A search onebox may include one or more search results shown in a particular shaped unit (e.g., a box, square, rectangle, etc.) with or without image content associated with the results. A search onebox can include highlight news, shopping, images, and or other results that can be blended into a few results. Box 308 can be performed manually by one or more language specialists, for example.

At box 312, the pattern generator 116 can automatically convert the manually selected patterns into grammar rules. Once the grammar rules are generated, the pattern generator 116 can automatically generate a pattern graph (e.g., S×S) at box 314. The pattern graph may be represented by an N×N matrix such as PatternGen matrix 316 of patterns that are connected based on various degrees of similarities. Example matrices are shown in FIG. 2A at 208, 210, and 212.

The system 100 can, for example, utilize information from pattern generator 116 with access to determining a search intent associated with a user. That is, system 100 can use predefined query patterns to determine a search intent for a user. For example, a set of query patterns that expresses a "Weather" intent may include [weather X] and [what is the weather in X]. The system 100 can match these patterns against the queries to generate query patterns.

Following the example above, given a set of "Weather" intent patterns in English, system 100 can additionally identify "Weather" intent queries in other languages and thus decide when to trigger a weather onebox. Moreover, such translations of query patterns can be performed without using any existing translation engine as input. In some implementations, the system 100 can be used to translate query patterns based on entity annotations. For example, the system 100 can translate the query "weather in paris" as well as query patterns that correlate to the query by using annotated string "paris" with a unique ID (e.g., "/m/05qtj") that is the canonical representation of "Paris," the capital city of France.

In general, automatic translation engines may not always translate query patterns reliably/correctly. This is especially so with ambiguous patterns such as [where is X playing] where "playing" can be interpreted as playing a musical instrument or playing in sports. The systems and methods described herein can translate query patterns while avoiding the use of a translation engine. The translation can include collecting a large set of queries in a source language and in a target language and annotating each query with the entities that it includes. For example, the query [weather in paris] will include an annotation that maps the sub-string "paris" to the identifier of the entity of the city of paris (/m/05qtj). By swapping the sub-string "paris" into "X," the query annotator 118 can generate the query pattern [weather in X]. Thus, each query can be converted into a pair: Pattern+ Entity.

In some implementations, the translation generator 120 can match query patterns between two languages by matching the frequencies of their co-occurrence with different entities. The set of queries that are annotated with the same entity are likely to express common intents independent of the language. For example, for the entity "barack obama," people can be interested in the weight or height of Barack Obama, irrespective of the language that is used in the search query. On the other hand, for the entity "everest", people will ask about the height of Mount Everest, but not about the weight of the mountain, irrespective of the language that is used in the search query Accordingly, even though "X height" and "X weight" might be mixed due to an entity like "barack obama", the same pair of patterns will be separated due to entities like "everest" (as people wouldn't ask for its weight). In other words, the co-occurrence of "X weight" with "everest" is low and thus it is less likely to be confused with "x height."

In one example implementation, the translation generator 120 can (1) define a set of entities [S]. For example, the translation generator 120 can define geographical locations, people, movies, etc. Next, the translation generator 120 can collect a large set of queries, annotate the entities from [S] in the queries, and convert each query into a pair (e.g., pattern, entity ID). For example, the translation generator 120 can collect queries from search logs (e.g., weather in paris) that can be converted into a pair (e.g., weather in X, /m/05qtj). In this example, an intent represented by the entity ID "/m/05qtj" is assigned to the query pattern "weather in X." The term /m/05qtj may represent the ID for Paris. Next, the translation generator 120 can denote $C_L(P,E)$ as the frequency of the pattern, entity pair (P, E) of queries in a language (L). Similarly, the translation generator 120 can denote $N_L(P,E)$ by normalizing $C_L(P,E)$ as $N_L(P,E)=[C_L(P,E)/\Sigma C_L(P,E)]$. Next, the translation generator 120 can compute a score to match patterns P1 in a first language L1 to patterns P2 in a second language L2. The score may be the correlation over E between $N_{L1}(P1,E)$ and $N_{L2}(P2,E)$. For each pattern in L1, the translation generator 120 can match it to the pattern L2 that maximizes the score.

The example above can provide the advantage of using an orthogonal signal for translation that can be combined with already existing signals. In addition, the translation can include automatic migration of search features triggering from English to other languages, which can be used to improve a translation engine. Once the system 100 finds triggering patterns for a particular feature (e.g., weather onebox), the system 100 can use the patterns to find other similar patterns in other languages. For example, an English pattern such as [weather in X] can be translated to [el tiempo en X] in Spanish. In such a way, some of the triggering patterns for Spanish can be learned automatically.

In some implementations, the translation generator 120 can translate query patterns from a source language into a target language, such that the desired translation is also a query pattern (in the target language). Although the following example translates query patterns from a first selected language into another selected language, selecting either target or source languages is unnecessary, as the system 100 can determine both.

In some implementations, the translation generator 120 can implement the following steps to generate a mapping from query patterns to the desired translated query patterns.

In this example, the translation generator 120 can translate English patterns to Spanish patterns.

Figure 4:
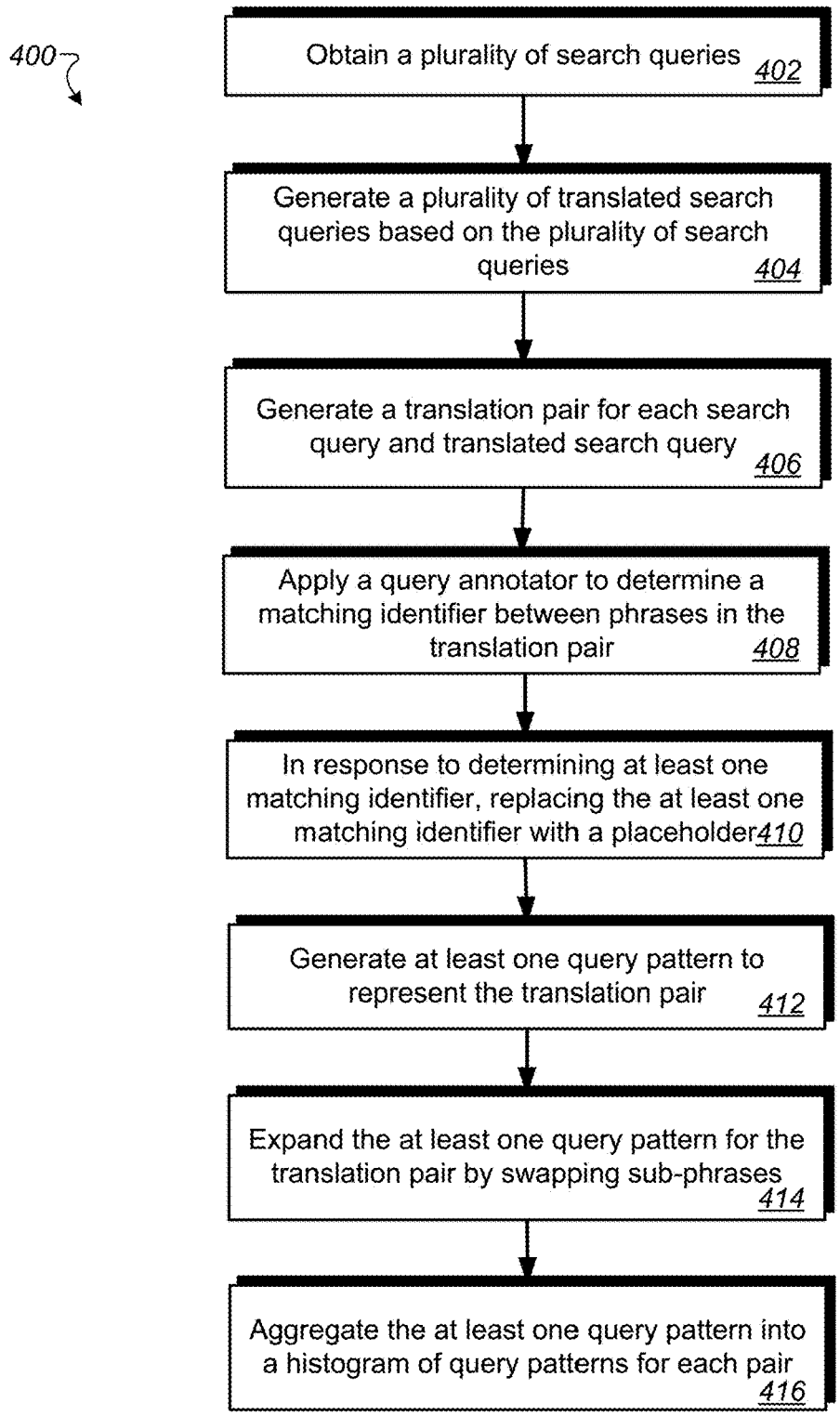
FIG. 4 is a flow chart diagramming one embodiment of a process for mapping a query pattern to a translated query pattern.

FIG. 4 is a flow chart diagramming one embodiment of a process 400 for mapping a query pattern to a translated query pattern. As shown at step 402, the translation generator 120 can obtain a plurality of search queries. At step 404, the translation generator 120 can access and/or prepare a large set of translated queries (e.g., English to Spanish and Spanish to English) based on the plurality of search queries.

In some implementations, the systems described herein can be configured to assign an intent to a query pattern. The intent may indicate a desire of a user to access information stored in web documents in a corpus, for example. The translation generator 120 can then associate the intent with a translation pair. The associating may include mapping the at least one query pattern to one or more translated search query pattern and using a classifier to denote that the two query patterns are substantially similar.

At step 406, the translation generator 120 can generate a translation pair for each search query and translated search query. At step 408, the translation generator 120 can, for each generated translation pair, apply a query annotator to determine a matching identifier between phrases in each translation pair. For example, the translation generator 120 can, for each translation, apply a query annotator on both the original query and the translated query. In some implementations, if the same unique identifier appears in either side of the translation, the respective sub-strings may be replaced with the variable "X" in both sides, contributing a relationship in the pattern level. For example, "weather in paris" and "el tiempo en paris" will be converted to "weather in X" and "el tiempo en X" because "paris" is annotated in both sides with the same unique identifier.

In one example, the matching identifier may be represented differently in different languages. For example, "ciudad de México" may represent "Mexico City" or as another example, "Germany" may represent "Deutschland." In this case, the system 100 can rely on a language annotator to assess the context of a particular query. In the event that the annotator provides an inaccurate context, the system 100 can provide information to correct and update the context.

At step 410 and in response to determining at least one matching identifier, the at least one matching identifier can be replaced with a placeholder. The placeholder may indicate a pattern relationship between the search query and the translated search query corresponding to the translation pair, as described throughout this disclosure.

At step 412, the translation generator 120 can generate at least one query pattern to represent the translation pair. The query pattern may be based at least in part on the matching identifier. In general, the translation pair may include a query pattern and a translated query pattern.

At step 414, the translation generator 120 can expand the at least one query pattern for the translation pair by swapping sub-phrases in the search queries that surround the matching identifier with sub-phrases in the translated search queries that surround the matching identifier. For example, the translation generator 120 can use an indexing engine or repository (e.g., engine 114 or repository 110) to expand the pairs of translated patterns. If, for example, we have the translation [weather in X]--->[el tiempo en X], and the engine 114 engine also determines that (a) [weather in X] is similar to [X weather] and that (b) [el tiempo en X] is similar to [X el tiempo], the pattern generator 116 can create all other possible matches between both sides, e.g., [weather in X]<-->[X el tiempo], [X weather]<-->[el tiempo en X], and [X weather]<-->[X el tiempo]

At step 416, the translation generator 120 can aggregate, for each translation pair, the at least one query pattern into a histogram of query patterns. The histogram can include patterns related to one another showing frequency of each pattern. The histogram of query patterns may be used to filter out improper translations due to the aggregation over many queries.

In order to translate the pattern [weather in X] to Spanish, a translator may be used. However, since typical translators work on queries and not query patterns, the system 100 can replace the "X" in the query pattern with some concrete string, e.g., "Madrid." Next, the translation of "weather in madrid" is "el tiempo en madrid." System 100 can conclude that [weather in X] is translated to [weather in madrid]. To broaden the query pattern and to check accuracy of the pattern translation, the system 100 can repeat the same exercise with many other cities and/or countries, etc. to obtain many candidate translation patterns from which the system 100 can select from. For example, system 100 may select particular patterns that repeat most often. Accordingly, the generated histogram of query patterns may refer to a collected set of translated patterns associated with their number of repetitions.

In some implementations, such a histogram can be used in combination with a large set of candidate query patterns, each of which is associated with exactly one of the following tags (1) MARKED_GOOD—meaning that the pattern has been verified by a language specialist as one that should trigger a search feature, such as a onebox search box, (2) MARKED_BAD—meaning that the pattern has been verified by a language specialist as one that should not trigger the feature, or (3) NO_TAG—meaning that this pattern has not been seen by a language specialist yet. Triggering the search feature may include providing for display to a user, a onebox display showing particular documents and content based on the tag and/or query pattern. In practice, the vast majority of the candidate patterns may be untagged. System 100 provides functionality that can automatically tag many of the untagged patterns (as either good or bad), based on the already tagged patterns.

Preparing a list of tagged query patterns is not a trivial step. A common existing technique starts by generating a large set of candidate patterns, which are then verified by a language specialist. However, using the techniques described herein, high accuracy is obtained without having to consult a language specialist for verification of the automatically predicted patterns. Hence, even for uncommon foreign languages, for which available statistical information for query interpretation may be much less than statistical information available for English search queries, query patterns may be obtained as described above so that that same advantages of using query patterns to determine search results and to trigger a given search feature such as a Onebox are available.

In general, the translation generator 120 can perform automatic prediction of query patterns that should trigger a given search feature, based on already tagged patterns. For example, generator 120 can generate a number of grammars (in ~40 languages) that can be used as indicators to whether a particular search feature should trigger or not (e.g., a Weather onebox). The decision whether to trigger a particular search feature (e.g., the "weather onebox") is often done by checking if a user query matches a query pattern from a predefined list. Such query patterns can be "weather in X", "X weather", "how is the weather in X," etc. For example, the query "weather in paris" matches "weather in X" should trigger the Weather onebox.

Implementations can include extracting a set of triggering phrases from already tagged query patterns. The triggering phrases may be deduced from a subclass of MARKED_GOOD patterns. For example, the pattern "X weather forecast" contributes the triggering phrase "weather forecast." A set of rewrite rules can also be deduced from pairs of two MARKED_GOOD patterns. For example, the pair "what is the weather in X" and "what is the temperature in X" contributes to a rewrite rule "weather"<--> "temperature." A set of bad phrases can also be deduced from pairs of MARKED_GOOD patterns and MARKED_BAD patterns. For example the pair "X weather" and "X weather underground" contributes the bad phrases "weather underground" and "underground."

In general, for every untagged pattern, the translation generator 120 can use the above three pieces of information to predict whether the pattern should be tagged as either good or bad, or alternatively predict whether the pattern should remain untagged.

A pattern may be marked bad if the pattern contains a bad phrase. The pattern can be marked good if the pattern contains a triggering phrase/sub-phrase or does not contain any bad phrases. The pattern can also be marked good if the pattern can be transformed into a known good pattern by applied one of the collected rewrite rules.

In a non-limiting example, if the following patterns are marked good: [X weather], [X temperature], [X weather this weekend], the candidate patterns [X temperature this weekend] will be predicted as good as well. This is because the translation generator 120 can conclude that [X temperature] is associated with "weather," which is a triggering phrase. Thus, [X temperature this weekend] contains a triggering phrase from [X weather] and [X temperature] can be used to create the rewrite rule "weather"<--> "temperature." Similarly, [X temperature this weekend] can be transformed to [X weather this weekend] using that rewrite rule, and the latter is known to be a good pattern.

Figure 5:
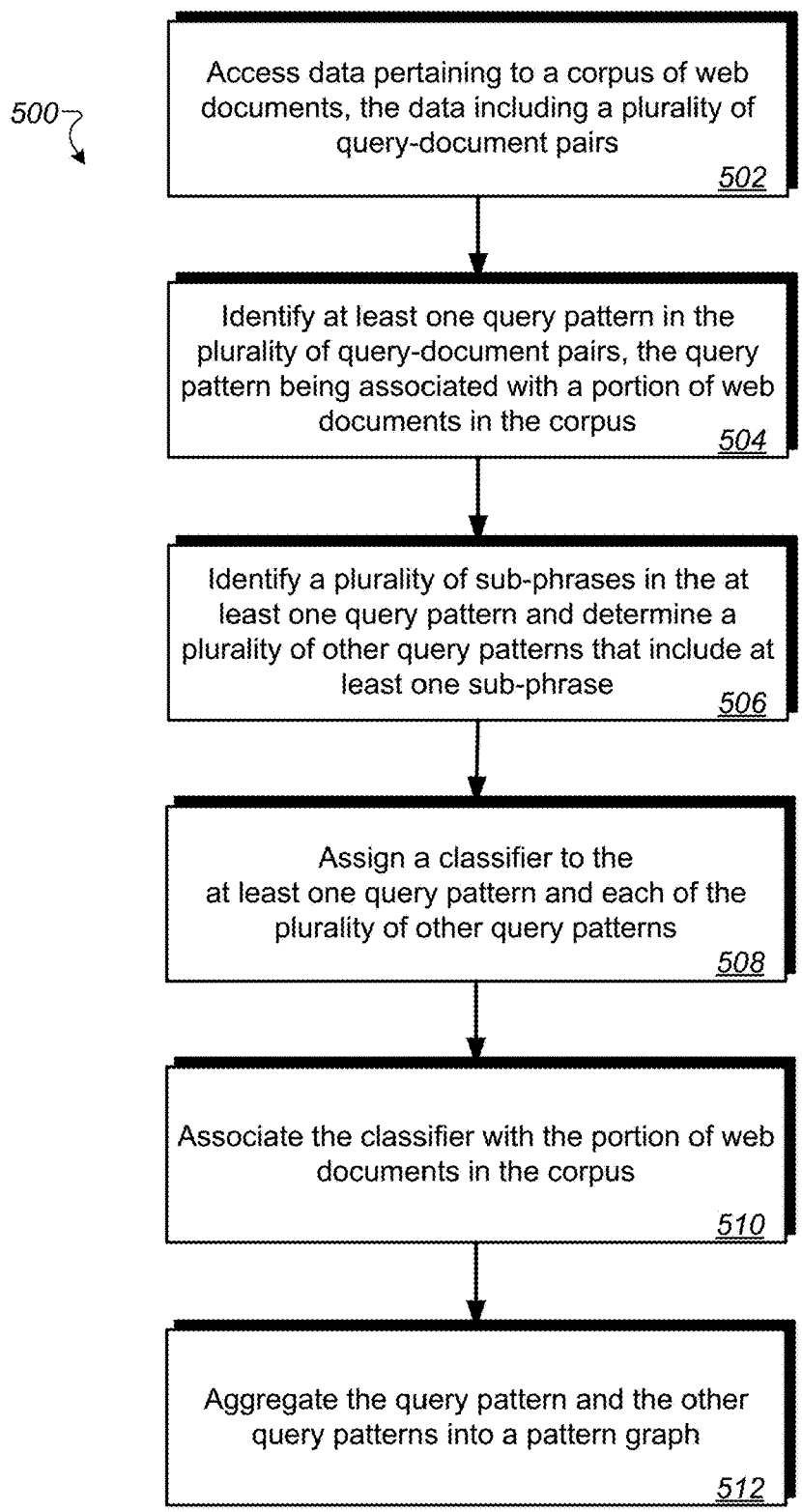
FIG. 5 is a flow chart diagramming one embodiment of a process to generate a pattern graph.

FIG. 5 is a flow chart diagramming one embodiment of a process 500 to generate a pattern graph. At step 502, the pattern generator 116, for example, can access data pertaining to a corpus of web documents. The data may include a plurality of query-document pairs.

At step 504, the pattern generator 116 may identify at least one query pattern in the plurality of query-document pairs. The query pattern can, for example, be associated with a portion of web documents in the corpus.

At step 506, the pattern generator 116 may identify a phrase and a plurality of sub-phrases in the at least one query pattern. In some implementations, the pattern generator 116 may simply identify sub-phrases. Upon identifying the phrase and a plurality of sub-phrases (or just sub-phrases), the pattern generator 116 can determine, in the corpus of web documents, a plurality of other query patterns that include at least one of the plurality of sub-phrases.

At step 508, the pattern generator 116 may assign an intent (e.g., a classifier) to the at least one query pattern and to each of the plurality of other query patterns that include at least one of the sub-phrases. The classifier may indicate a desire of a user to access information stored particularly in the portion of web documents in the corpus. Accessing information stored particularly may indicate that the user wishes to access information in the portion of the web documents and may not wish to access information in other web documents that are not in the portion.

At step 510, the pattern generator 116 may associate the classifier with the portion of web documents in the corpus. At step 512, the pattern generator 116 may aggregate the portion of web documents into a pattern graph configured to represent similarities between at least two of the portions of web documents. The pattern graph may be a histogram, a matrix, a plot, or a scatter plot matrix, or any combination thereof.

The method 500 may also include identifying a plurality of additional query patterns in the plurality of query-document pairs and for each of the additional query patterns, the method 500 may further include identifying a plurality of sub-phrases in the additional query patterns and determining, in the corpus of web documents, a plurality of other query patterns that include at least one of the plurality of sub-phrases in the additional query patterns, assigning the classifier to the additional query pattern and each of the other query patterns, associating the classifier with a portion of web documents in the corpus, and aggregating the query pattern and the other query patterns into the pattern graph according to the classifier.

Aggregating the portion of web documents into a pattern graph may include assembling a graph that includes a plurality of nodes and edges, each node representing a query pattern and each edge representing a score of similarity between two query patterns. The method 500 may include using a neighbor node to filter out one or more query patterns that correspond to classifiers other than the associated classifier. In some implementations, the pattern graph is configured to represent similarities between at least two of the query patterns.

In some implementations, the system 100 can be configured to identify and associate answer patterns with query patterns. For example, the system 100 can identify answer patterns, associate answer patterns with query patterns, identify vague answer patterns, and calculate a relationship score between an answer pattern and query pattern.

A query pattern can be applied to queries (e.g., queries seeking a fact). For example, "How long does the flu last" is a query. A query pattern identifies common ways of searching for the same fact. For example, "How long does X last" has the same intent as "X duration", "Length of X", and "How long does X take." Implementations provide a way to determine common answer patterns to such queries. The answer patterns can be used as a signal in scoring documents responsive to similar queries, or in knowledge base expansion by identifying facts with a high degree of confidence.

In the above example, the system 100 may use (or build) a table that maps questions to answers. Such a table may be generated from parsing documents on the web for questions (or headers) followed by an answer. The system 100 may identify a sub-phrase that appears in the query and in the answer and replace that sub-phrase with a variable or placeholder. Thus, "how long does stomach flu last" may be associated with the answer "stomach flue rarely lasts longer than 1 to 3 days, but it may be weeks before full recovery" in the database. The system may identify the sub-phrase "stomach flu" in both the query and answer and replace it with X. Then, the system may parse the answers into potential answer prefixes, for example with no more than 15 terms. For example, the answer above may result in potential answer prefixes of "X rarely lasts" "X rarely" "X rarely lasts longer" "X rarely lasts longer than," etc. Each potential answer is associated with the question pattern, in this example "how long does X last."

Once this process is repeated over hundreds of thousands (or millions) of query/answer pairs, the system 100 may aggregate the answers, so that there is a count of the number of times a particular query pattern matches a particular answer pattern. The count may be called the instance count for the query/answer pattern pair. The query patterns may be ranked for the answer pattern by the instance count, thus the query pattern that occurs most often for the potential answer is ranked at the top (referred to as the top query). Thus, aggregation results in a plurality of query patterns associated with each potential answer pattern.

The system 100 may score the relationship between each answer pattern and its associated queries (or the top 10 or 20 query patterns for the potential answer pattern). The score may be based on the instance count (e.g., the number of times the query pattern and the answer pattern appear together) and a cluster score for the potential answer pattern. The cluster score may represent how vague a potential answer pattern is. Potential answer patterns that are vague correspond to many different types of query patterns and therefore should not have a strong relationship with a particular type of query pattern. For example, "X is played . . . " is a potential answer pattern that can apply to many dissimilar queries, such as "how is a violin played" or "where is baseball played" or even "how to meditate." Such potential answer patterns may be discarded or given a low cluster score so that the relationship between the answer pattern and query pattern is demoted.

To determine the cluster score, the system may determine, for one answer pattern, how many of the top query patterns (e.g., the top 10 query patterns) are related or similar. A query similarity signal is often determined using a "similar query" generator, common in most search engines. Such a signal is often based on the similarity of search results returned, but can be based on other factors as well. If most of the query patterns in the top 10 query patterns for the answer pattern are similar, the cluster score will be high. In some implementations, it is the ratio of the number of similar query patterns to the total number considered (e.g., 10). The system 100 may multiply the cluster score for the answer by the instance count for a particular query pattern to determine a relationship score for the query pattern-answer pattern pair. If the product is above a threshold, the system may map the query pattern to the answer pattern and associate it with the relationship score.

The mapping may be used as one signal in ranking search results. For example, when a query matches one of the query patterns, a search system may look at the returned search results to determine which one(s) match the answer patterns associated with that query pattern. The relationship score may be used to boost or promote a search result that matches the answer pattern, as it is more likely to be a good answer to the query.

The mapping may also be used to automatically mine facts from the Internet to expand a knowledge base. For example, as documents are parsed, a knowledge base expansion system may notice that the text being parsed matches a query pattern and that text following it matches an answer pattern. The text matching the variable portion of the pattern (e.g., the X) may be an entity and the answer pattern may have a second variable (e.g., Y) that represents the factual answer. For example, when the text "Abraham Lincoln was 6 feet tall" matches the answer pattern "X is Y tall" the system may automatically extract "6 feet" as a fact for the height of Abraham Lincoln and add it to the knowledge base.

In general, the system 100 can match answer patterns to query patterns, rank a matched answer pattern to a query pattern, aggregate answer patterns to determine which query patterns to associate with the answer pattern, which answer patterns are vague, and to score the relationship between each query pattern and answer pattern. The system 100 can use the query pattern/answer patterns to score search results.

In some implementations, the systems and methods in this disclosure can provide advantages such as improving search functionality, especially in foreign languages. This is because using similar patterns to rewrite user queries into a more common query (without losing the intent), can provide more precise search results. In addition, the systems and methods in this disclosure can provide the advantage of being able to generate query patterns that should trigger a particular search feature (e.g., Weather, Local Time, Sports, Unit Conversion, and so on).

System 100 can be configured to perform many algorithms and implementations of such algorithms. Several of such implementations are listed below. Implementations include a system that converts a set of similar search queries to a set of query patterns, using repeating sub-phrases. Implementations include a system that generates an aggregated "pattern graph" or "matrix" holding many pairs of query patterns that are likely to be similar to each other (i.e., represent a similar user intent). The pairs are pulled from billions of web documents. The pattern graph includes nodes and edges/neighbor nodes, in which every query pattern is a node, and every two similar nodes are connected on an edge that represents some score of similarity. Implementations include a system that uses "similar neighbors" in order to filter any off-topic candidate patterns. The invention can resolve many bad cases where two patterns (e.g., [X treatment] and [X symptoms]) are considered similar because many documents get traffic from both. Using similar neighbors criteria, the algorithm understands they are not similar.

In some implementations, the generated query patterns can be used to generate grammars both automatically and manually. In some implementations, the generated query patterns can be used to expand search scope (e.g., onebox triggering) as well as structured answers triggering.

In addition, the systems and methods described herein can be used to generate synonyms, improve translation of queries by learning translations of queries patterns, based on many instances, and learn offensive query patterns, and put them in a blacklist.

Figure 6:
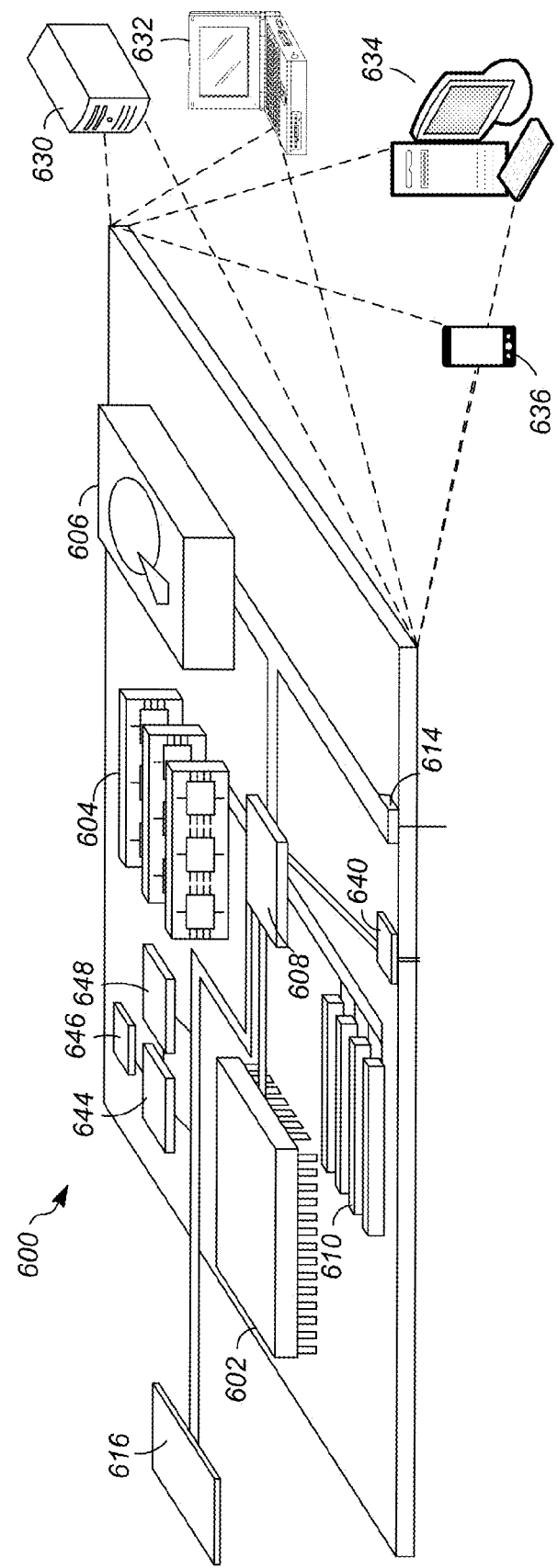
FIG. 6 shows an example of a computer device that can be used to implement the described techniques.

FIG. 6 shows an example of a generic computer device 600, which may be used with the techniques described here. Computing device 600 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a computing device, such as a laptop computer 632, personal computer 634, or tablet/smart phone 636. An entire system may be made up of multiple computing devices 600 communicating with each other. Other configurations are possible.

Figure 7:
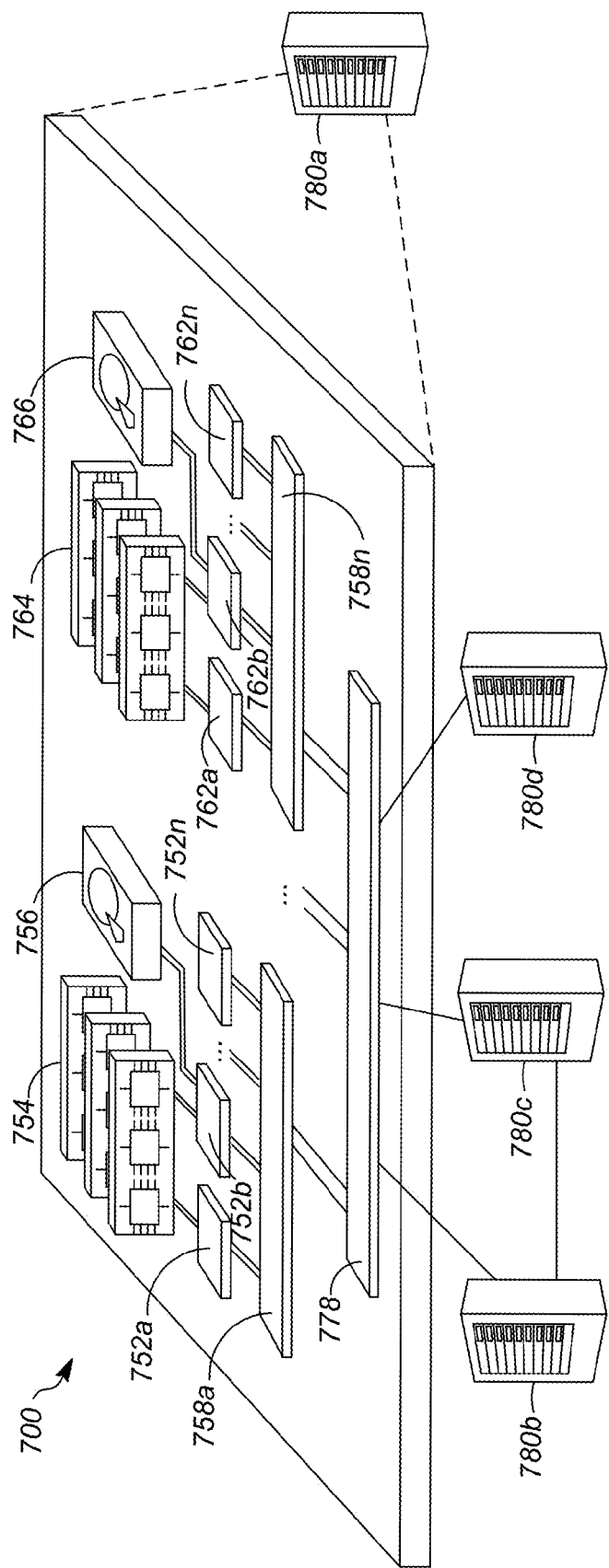
FIG. 7 shows an example of a distributed computer device that can be used to implement the described techniques.

FIG. 7 shows an example of a generic computer device 700, which may be server 108 of FIG. 1, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-952n and 762a-962n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-952n. Data structures, such as an index, may be stored, for example, across storage 756 and memory 754. Computing device 700 may include other components not shown, such as controllers, buses, input/output devices, communications modules, etc.

An entire system, such as system 100, may be made up of multiple computing devices 700 communicating with each other. For example, device 780a may communicate with devices 780b, 780c, and 780d, and these may collectively be known as system 100. As another example, system 100 of FIG. 1 may include one or more computing devices 700. Some of the computing devices may be located geographically close to each other, and others may be located geographically distant. The layout of system 700 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other. A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

In the following, further examples of the system and method according to the present disclosure are described A first example concerns a computer implemented method for generating a pattern graph, the method comprising: accessing data pertaining to a corpus of web documents, the data including a plurality of query-document pairs; identifying at least one query pattern in the plurality of query-document pairs, the query pattern being associated with a portion of web documents in the corpus; identifying a plurality of sub-phrases in the at least one query pattern; determining, in the corpus of web documents, a plurality of other query patterns that include at least one of the plurality of sub-phrases; assigning a classifier to the at least one query pattern and each of the plurality of other query patterns that include at least one of the sub-phrases; associating the classifier with the portion of web documents in the corpus; and aggregating the query pattern and the other query patterns into a pattern graph.

In a second example based on the first example, the pattern graph is configured to represent similarities between at least two of the portions of web documents.

In a third example based on first or second example, the intent/classifier is associated with user input and includes one or more determined topic categories and a level of specificity within the one or more topic categories.

In a fourth example based on one of the first to third example, the method further comprises assigning the intent/ classifier to the at least one query pattern based on matching at least one of the sub-phrases to at least one web document in the corpus.

In a fifth example based on one of the first to fourth example, the method further comprises: identifying a plurality of additional query patterns in the plurality of query-document pairs, and for each of the additional query patterns: identifying a plurality of sub-phrases in the additional query patterns and determining, in the corpus of web documents, a plurality of other query patterns that include at least one of the plurality of sub-phrases in the additional query patterns; assigning the intent/classifier to the additional query pattern and each of the other query patterns; associating the intent/classifier with a portion of web documents in the corpus; and aggregating the additional query patterns into the pattern graph according to the intent/classifier.

In a sixth example based on one of the first to fifth example, aggregating the query pattern and the other query patterns into a pattern graph includes assembling a graph that includes a plurality of nodes and edges, each node representing a query pattern and each edge representing a score of similarity between two or more query patterns in the graph.

In a seventh example based on the sixth example, the method further comprises using a neighbor node to filter out one or more query patterns that correspond to intents/classifiers other than the associated intent/classifier.

In an eighth example based on one of the first to seventh example, the pattern graph includes at least one of a histogram, a matrix, a plot, and a scatter plot matrix.

A ninth example is concerned with a computer implemented method, the method comprising: obtaining a plurality of search queries; generating a plurality of translated search queries based on the plurality of search queries; generating a translation pair for each search query and translated search query; for each generated translation pair: applying a query annotator to determine a matching identifier between phrases in the translation pair; in response to determining at least one matching identifier, replacing the at least one matching identifier with a placeholder, the placeholder indicating a pattern relationship between the search query and the translated search query corresponding to the translation pair; generating at least one query pattern to represent the translation pair, the query pattern based at least in part on the matching identifier; and expanding the at least one query pattern for the translation pair by swapping sub-phrases in the search queries that surround the matching identifier with sub-phrases in the translated search queries that surround the matching identifier.

In a tenth example based on the ninth example, the method further comprises aggregating, for each translation pair, the at least one query pattern into a histogram of query patterns.

In an eleventh example based on the ninth or tenth example, the method further comprises assigning an intent/classifier to the at least one query pattern, the intent/classifier indicating a desire of a user to access information stored in web documents in a corpus; and associating the intent/classifier with the translation pair, the associating including mapping the at least one query pattern to one or more translated search query pattern.

In a twelfth example based on the ninth to eleventh example, each translation pair includes a query pattern and a translated query pattern.

A thirteenth example is concerned with a system comprising: at least one processor; memory storing instructions that, when executed by the at least one processor, cause the system to perform operations including, accessing data pertaining to a corpus of web documents, the data including a plurality of query-document pairs; identifying at least one query pattern in the plurality of query-document pairs, the query pattern being associated with a portion of web documents in the corpus; identifying a phrase and a plurality of sub-phrases in the at least one query pattern; determining, in the corpus of web documents, a plurality of other query patterns that include at least one of the plurality of sub-phrases; assigning an intent/classifier to the at least one query pattern and each of the plurality of other query patterns that include at least one of the sub-phrases, the intent/classifier indicating a desire of a user to access information stored in the portion of web documents in the corpus; associating the intent/classifier with the portion of web documents in the corpus; and aggregating the query pattern and the other query patterns into a pattern graph.

In a fourteenth example based on the thirteenth example, the pattern graph is configured to represent similarities between at least two of the portions of web documents.

In a fifteenth example based on the thirteenth or fourteenth example, the intent/classifier is associated with user input and includes one or more determined topic categories and a level of specificity within the one or more topic categories.

In a sixteenth example, based on one of the thirteenth to fifteenth example, the operations further comprise assigning the intent/classifier to the at least one query pattern based on matching at least one of the sub-phrases to at least one web document in the corpus.

In a seventeenth example based on one of the thirteenth to sixteenth example, the operations further comprise identifying a plurality of additional query patterns in the plurality of query-document pairs, and for each of the additional query patterns: identifying a phrase and a plurality of sub-phrases in the additional query patterns and determining, in the corpus of web documents, a plurality of other query patterns that include at least one of the plurality of sub-phrases in the additional query patterns; assigning the intent/classifier to the additional query pattern and each of the other query patterns; associating the intent/classifier with a portion of web documents in the corpus; and aggregating the additional query patterns into the pattern graph according to the intent/classifier.

In an eighteenth example based on one of the thirteenth to seventeenth example, aggregating the query pattern and the other query patterns into a pattern graph includes assembling a graph that includes a plurality of nodes and edges, each node representing a query pattern and each edge representing a score of similarity between two or more query patterns in the graph.

In a nineteenth example based on the eighteenth example, the operations further comprise using a neighbor node to filter out one or more query patterns that correspond to intents/classifiers other than the associated intent/classifier.

In a twentieth example based on one of the thirteenth to nineteenth example, the pattern graph includes at least one of a histogram, a matrix, a plot, and a scatter plot matrix.

What is claimed is:
1. A computer implemented method comprising:
   accessing data pertaining to a corpus of web documents, the data including a plurality of query-document pairs;
   identifying at least one query pattern in the plurality of query-document pairs, the query pattern being associated with a portion of the web documents in the corpus;
   identifying a plurality of sub-phrases in the at least one query pattern;

identifying, in the corpus of web documents, a plurality of other query patterns that include at least one of the plurality of sub-phrases;

for each identified query pattern and other query pattern that include the plurality of sub-phrases:

assigning a classifier to respective query patterns and respective other query patterns;

associating the classifier with the portion of the web documents in the corpus; and aggregating the respective query patterns and the respective other query patterns into a pattern graph based at least in part on the classifier, wherein the pattern graph is configured to represent similarities between at least two of the portions of web documents and wherein aggregating the respective query patterns and the respective other query patterns into the pattern graph includes assembling a graph that includes a plurality of nodes and edges, each node representing a query pattern and each edge representing a score of similarity between two or more query patterns in the graph.

2. The method of claim 1, wherein the classifier is associated with user input and includes one or more determined topic categories and a level of specificity within the one or more determined topic categories.

3. The method of claim 1, further comprising assigning the classifier to the at least one query pattern based on matching at least one of the sub-phrases to at least one web document in the corpus.

4. The method of claim 1, further comprising identifying a plurality of additional query patterns in the plurality of query-document pairs, and for each of the additional query patterns:

identifying a phrase and the plurality of sub-phrases in the plurality of additional query patterns and determining, in the corpus of web documents, query patterns that include at least one of the plurality of sub-phrases in the plurality of additional query patterns;

assigning the classifier to the plurality of additional query patterns and each of the query patterns that include at least one of the plurality of sub-phrases in the plurality of additional query patterns;

associating the classifier with the portion of web documents in the corpus; and aggregating the plurality of additional query patterns into the pattern graph according to the classifier.

5. The method of claim 4, further comprising using a neighbor node to filter out one or more query patterns that correspond to classifiers other than the associated classifier.

6. The method of claim 1, wherein the pattern graph includes at least one of a histogram, a matrix, a plot, and a scatter plot matrix.

7. A system comprising:

at least one processor;

memory storing instructions that, when executed by the at least one processor, cause the system to perform operations including, accessing data pertaining to a corpus of web documents, the data including a plurality of query-document pairs;

identifying at least one query pattern in the plurality of query-document pairs, the at least one query pattern being associated with a portion of the web documents in the corpus;

identifying a plurality of sub-phrases in the at least one query pattern;

identifying, in the corpus of web documents, a plurality of other query patterns that include at least one of the plurality of sub-phrases;

for each identified query pattern and other query patterns that include the plurality of sub-phrases:

assigning a classifier to the respective query patterns and respective other query patterns;

associating the classifier with the portion of the web documents in the corpus; and aggregating the respective query patterns and the respective other query patterns into a pattern graph based at least in part on the classifier, wherein the pattern graph is configured to represent similarities between at least two of the portions of web documents and wherein aggregating the respective query patterns and the other respective query patterns into the pattern graph includes assembling a graph that includes a plurality of nodes and edges, each node representing a query pattern and each edge representing a score of similarity between two or more query patterns in the graph.

8. The system of claim 7, wherein the classifier is associated with user input and includes one or more determined topic categories and a level of specificity within the one or more determined topic categories.

9. The system of claim 7, wherein the operations further comprise assigning the classifier to the at least one query pattern based on matching at least one of the sub-phrases to at least one web document in the corpus.

10. The system of claim 7, wherein the operations further comprise identifying a plurality of additional query patterns in the plurality of query-document pairs, and for each of the additional query patterns:

identifying the plurality of sub-phrases in the plurality of additional query patterns and determining, in the corpus of web documents, query patterns that include at least one of the plurality of sub-phrases in the plurality of additional query patterns;

assigning the classifier to the plurality of additional query patterns and each of the query patterns that include at least one of the plurality of sub-phrases in the plurality of additional query patterns;

associating the classifier with the portion of web documents in the corpus; and aggregating the plurality of additional query patterns into the pattern graph according to the classifier.

11. The system of claim 10, wherein the operations further comprise using a neighbor node to filter out one or more query patterns that correspond to classifiers other than the associated classifier.

12. The system of claim 7, wherein the pattern graph includes at least one of a histogram, a matrix, a plot, and a scatter plot matrix.

13. The method of claim 1, wherein identifying the plurality of other query patterns includes comparing the plurality of sub-phrases to data associated with documents in the corpus of web documents to determine matches between at least one of the plurality of sub-phrases and query patterns associated with one or more of the documents in the corpus of web documents.

14. The method of claim 1, wherein the plurality of query-document pairs represent relationships associating respective queries from which respective documents are selected for view by users entering the respective queries.

15. A non-transitory machine-readable media storing machine-readable instructions that, when executed, cause a machine to perform a method, comprising:

accessing data pertaining to a corpus of web documents, the data including a plurality of query-document pairs;

identifying at least one query pattern in the plurality of query-document pairs, the at least one query pattern being associated with a portion of the web documents in the corpus;

identifying a plurality of sub-phrases in the at least one query pattern;

identifying, in the corpus of web documents, a plurality of other query patterns that include at least one of the plurality of sub-phrases;

for each identified query pattern and other query patterns that include the plurality of sub-phrases:

assigning a classifier to the respective query patterns and respected other query patterns;

associating the classifier with the portion of the web documents in the corpus; and aggregating the respective query patterns and the respective other query patterns into a pattern graph based at least in part on the classifier, wherein the pattern graph is configured to represent similarities between at least patterns and the other respective query patterns into the pattern graph includes assembling a graph that includes a plurality of nodes and edges, each node representing a query pattern and each edge representing a score of similarity between two or more query patterns in the graph.

16. The non-transitory machine readable media of claim 15, wherein the classifier is associated with user input and includes one or more determined topic categories and a level of specificity within the one or more determined topic categories.

17. The non-transitory machine readable media of claim 15, further comprising assigning the classifier to the at least one query pattern based on matching at least one of the sub-phrases to at least one web document in the corpus.

18. The non-transitory machine readable media of claim 15, further comprising identifying a plurality of additional query patterns in the plurality of query-document pairs, and for each of the addition al query patterns:

identifying the plurality of sub-phrases in the plurality of additional query patterns and determining, in the corpus of web documents, query patterns that include at least one of the plurality of sub-phrases in the plurality of additional query patterns;

assigning the classifier to the plurality of additional query patterns and each of the query patterns that include at least one of the plurality of sub-phrases in the plurality of additional query patterns;

associating the classifier with the portion of web documents in the corpus; and aggregating the plurality of additional query patterns into the pattern graph according to the classifier.

19. The non-transitory machine readable media of claim 18, further comprising using a neighbor node to filter out one or more query patterns that correspond to classifiers other than the associated classifier.

20. The non-transitory machine readable media of claim 15, wherein the pattern graph includes at least one of a histogram, a matrix, a plot, and a scatter plot matrix.

* * * * *

UNITED STATES PATENT AND TRADEMARK OFFICE
CERTIFICATE OF CORRECTION

PATENT NO. : 10,467,256 B2
APPLICATION NO. : 15/227456
DATED : November 5, 2019
INVENTOR(S) : Shmiel et al.

It is certified that error appears in the above-identified patent and that said Letters Patent is hereby corrected as shown below:

In the Claims

In Columns 24-25, Claim 15, Line 21, delete "patterns" and insert -- two of the portions of web documents and wherein aggregating the respective query patterns --, therefor.

Signed and Sealed this
Twenty-fourth Day of December, 2019

Andrei Iancu
*Director of the United States Patent and Trademark Office*